(12) United States Patent
Shimodaira et al.

(10) Patent No.: US 12,264,954 B2
(45) Date of Patent: Apr. 1, 2025

(54) FLOW SENSOR ELEMENT

(71) Applicant: KOA CORPORATION, Nagano (JP)

(72) Inventors: Masahiro Shimodaira, Nagano (JP); Katsuya Miura, Nagano (JP)

(73) Assignee: KOA CORPORATION, Nagano (JP)

( * ) Notice: Subject to any disclaimer, the term of this patent is extended or adjusted under 35 U.S.C. 154(b) by 197 days.

(21) Appl. No.: 18/013,705

(22) PCT Filed: Jun. 16, 2021

(86) PCT No.: PCT/JP2021/022792
§ 371 (c)(1),
(2) Date: Dec. 29, 2022

(87) PCT Pub. No.: WO2022/004373
PCT Pub. Date: Jan. 6, 2022

(65) Prior Publication Data
US 2023/0296418 A1 Sep. 21, 2023

(30) Foreign Application Priority Data
Jul. 1, 2020 (JP) .................................. 2020-113910

(51) Int. Cl.
*G01F 1/692* (2006.01)
*G01F 1/684* (2006.01)
(Continued)

(52) U.S. Cl.
CPC .............. *G01F 1/692* (2013.01); *G01F 1/684* (2013.01); *G01F 1/696* (2013.01); *G01K 7/16* (2013.01);
(Continued)

(58) Field of Classification Search
CPC .......... G01F 1/692; G01F 1/684; G01F 1/696; G01K 7/16; G01K 13/02; G01K 7/20; G01P 5/12; H01C 7/006; H01C 7/22
See application file for complete search history.

(56) References Cited

U.S. PATENT DOCUMENTS 5,423,213 A * 6/1995 Yajima .................... G01F 1/684
73/204.26
5,852,236 A * 12/1998 Honda ...................... G01P 1/02
73/170.15
(Continued)

FOREIGN PATENT DOCUMENTS

CN 2136464 Y * 6/1993
JP 61-133866 A 6/1986
(Continued)

OTHER PUBLICATIONS

CN-2136464-Y, English Translation (Year: 1993).*
(Continued)

*Primary Examiner* — Ryan D Walsh
(74) *Attorney, Agent, or Firm* — Greenblum & Bernstein, P.L.C.

(57) ABSTRACT

An object is to provide a flow sensor element is non-directional and has an excellent sensor sensitivity. A flow sensor element includes a base body having a spherical shape, and a temperature-sensitive film pattern that is disposed over the entirety of a surface of the base body, and changes in an electrical resistance value due to a change in temperature. It is preferable that the temperature-sensitive film pattern be formed by trimming a temperature-sensitive film that has been formed on the surface of the base body. In the flow sensor element, the temperature-sensitive film pattern can be disposed over the entirety of the surface of the base body having a spherical shape. This enables a constant sensor sensitivity to be obtained regardless of a direction of a fluid, and the accuracy of detection of a flow rate can be improved.

3 Claims, 2 Drawing Sheets

(51) Int. Cl.
- *G01F 1/696* (2006.01)
- *G01K 7/16* (2006.01)
- *G01K 13/02* (2021.01)
- *G01P 5/12* (2006.01)
- *H01C 7/00* (2006.01)
- *H01C 7/22* (2006.01)
- *G01K 7/20* (2006.01)

(52) U.S. Cl.
CPC ............... *G01K 13/02* (2013.01); *G01P 5/12* (2013.01); *H01C 7/006* (2013.01); *H01C 7/22* (2013.01); *G01K 7/20* (2013.01)

(56) References Cited

U.S. PATENT DOCUMENTS

| | | | | |
|---|---|---|---|---|
| 2003/0056584 | A1* | 3/2003 | Park | G01F 1/692 73/204.11 |
| 2007/0041870 | A1* | 2/2007 | Yamanaka | G01N 29/2462 422/82.01 |
| 2012/0137765 | A1 | 6/2012 | Wagner et al. | |
| 2018/0045751 | A1 | 2/2018 | Kearney et al. | |
| 2018/0106687 | A1* | 4/2018 | Suzuki | H01C 3/12 |
| 2018/0254129 | A1* | 9/2018 | Suzuki | H01C 1/142 |
| 2019/0170556 | A1* | 6/2019 | Ikeno | G01F 1/698 |
| 2024/0247960 | A1* | 7/2024 | Kanegae | G01F 1/696 |

FOREIGN PATENT DOCUMENTS

| | | | |
|---|---|---|---|
| JP | 63-210666 A | | 9/1988 |
| JP | 10-281839 A | | 10/1998 |
| JP | 2020-3354 A | | 1/2020 |
| JP | 2020-8370 A | | 1/2020 |
| JP | 2022012231 A | * | 1/2022 |

OTHER PUBLICATIONS

JP-2022012231-A, English Translation (Year: 2022).*
International Search Report issued in International Bureau of WIPO Patent Application No. PCT/JP2021/022792, dated Aug. 24, 2021, along with an English translation thereof.

* cited by examiner

FLOW SENSOR ELEMENT

TECHNICAL FIELD

The present invention relates to a flow sensor element that is capable of measuring, for example, wind speed.

BACKGROUND ART

A thermal flow sensor element is known that exposes a heated resistor element for sensing a flow rate to a fluid and detects a flow rate of the fluid on the basis of a heat dissipation effect at this time. For example, Patent Literatures 1 and 2 disclose a wind state measuring apparatus in which a plurality of temperature-sensitive elements is dispersively stuck on a surface of a casing having a circular sectional shape, the plurality of temperature-sensitive elements receiving a thermal influence from outside air by performing heat exchange with outside air due to heat conduction, and an orientation and speed of wind that flows around the casing are measured. In Patent Literatures 1 and 2, a heater is included inside the casing in order to heat the temperature-sensitive elements.

CITATION LIST

Patent Literature

Patent Literature 1: JP 2020-8370 A
Patent Literature 2: JP 2020-3354 A

SUMMARY OF INVENTION

Technical Problem

However, in the configurations of Patent Literatures 1 and 2, a large number of temperature-sensitive elements need to be disposed on the surface of the casing, and the disposition of the temperature-sensitive elements easily causes a variation in sensor sensitivity depending on a blowing direction of wind.

The present invention has been made in view of the problem described above, and it is an object of the present invention to provide a flow sensor element that is non-directional and has an excellent sensor sensitivity.

Solution to Problem

A flow sensor element according to the present invention includes a base body having a spherical shape, and a temperature-sensitive film pattern that is disposed over the entirety of a surface of the base body, and changes in an electrical resistance value due to a change in temperature.

Advantageous Effects of Invention

In the flow sensor element according to the present invention, the temperature-sensitive film pattern can be disposed over the entirety of the surface of the base body having a spherical shape. This enables a constant sensor sensitivity to be obtained regardless of a direction of a fluid, and the accuracy of detection of a flow rate can be improved.

DESCRIPTION OF EMBODIMENTS

Figure 1:
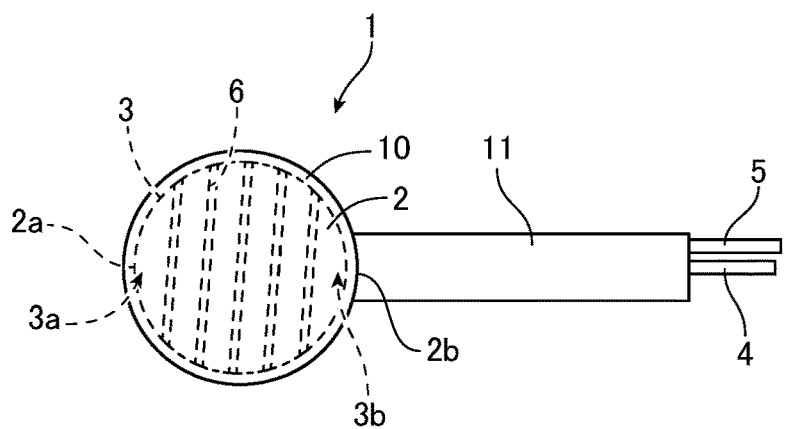
FIG. 1 is a side view of a flow sensor element according to the present embodiment.

An embodiment of the present invention (hereinafter simply referred to as an "embodiment") is described in detail below. The present invention is not limited to the embodiment described below, and can be subjected to various modifications for implementation within the scope of the gist thereof.

A flow sensor element 1 according to the present embodiment is a thermal flow sensor element 1, and includes a base body 2 having electrical insulation, a temperature-sensitive film pattern 3 that is disposed over the entirety of a surface of the base body 2, and a first wiring portion 4 and a second wiring portion 5 that are respectively electrically connected to both ends of the temperature-sensitive film pattern 3.

Figure 3:
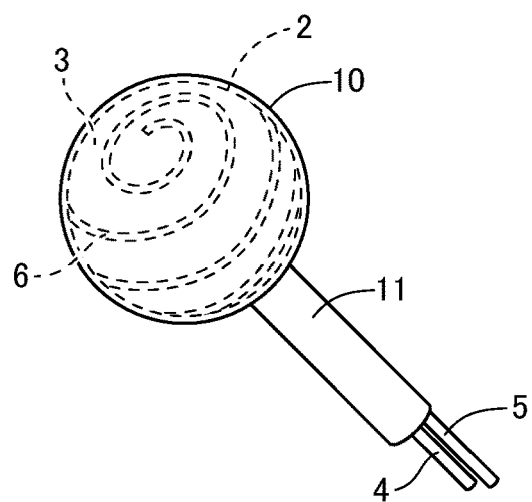
FIG. 3 is a perspective view of the flow sensor element according to the present embodiment.

As illustrated in FIGS. 1 and 3, the base body 2 has a spherical shape. A material of the base body 2 is not particularly limited, if the material is an electrical insulator. As an example, the base body 2 is formed by using, for example, glass. Furthermore, the diameter of the base body 2 is not limited, and can be variously adjusted depending on the purposes of use. As an example, the base body 2 can have a diameter of about 4 mm.

Figure 2:
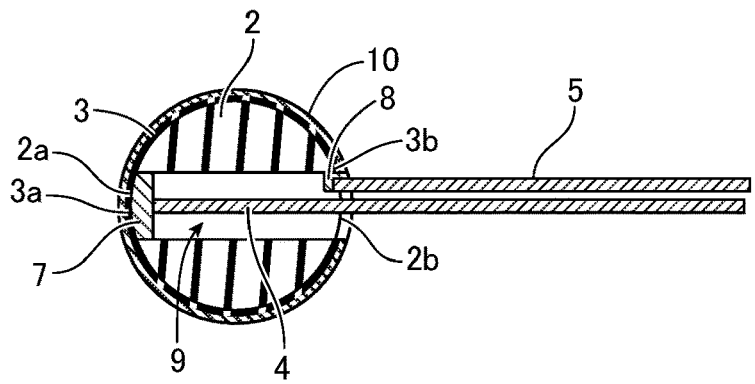
FIG. 2 is a sectional view of the flow sensor element according to the present embodiment.

As illustrated in FIGS. 1 to 3, the temperature-sensitive film pattern 3 is disposed over the entirety of a surface of the base body 2. Note that it is preferable that the temperature-sensitive film pattern 3 be formed on the surface of the base body 2 to have a single pattern. It is preferable that the temperature-sensitive film pattern 3 be formed, for example, by trimming a temperature-sensitive film that has been formed on the surface of the base body 2 such that a uniform film can be formed over the entirety of the surface of the base body 2. Examples of trimming processing include laser processing and etching processing. Note that the temperature-sensitive film pattern 3 is formed by using photolithography technique, and this enables a reduction in a manufacturing cost. Here, the "entirety of the surface" refers to a region excluding a trimming line 6.

A material of the temperature-sensitive film pattern 3 is not limited, but it is preferable that a platinum (Pt) film be used. By using the platinum film, deterioration with time can be reduced. Therefore, a temperature-sensitive film pattern 3 that is made of platinum and has high durability can be formed over the entirety of the surface of the base body 2.

Furthermore, in the present embodiment, a pattern shape of the temperature-sensitive film pattern 3 is not limited, but it is preferable that the temperature-sensitive film pattern 3 be formed to have a spiral pattern, as illustrated in FIGS. 1 and 3. Therefore, whichever direction wind hits the flow sensor element 1 from, a uniform sensor sensitivity can be achieved.

In the temperature-sensitive film pattern 3, an electrical resistance value changes due to a change in temperature. The temperature-sensitive film pattern 3 is maintained in a high temperature state due to conductiveness between the wiring portions 4 and 5. Control is performed in such a way that if wind hits the temperature-sensitive film pattern 3, the temperature of the temperature-sensitive film pattern 3 decreases, and this causes a change in the electrical resistance value of the temperature-sensitive film pattern 3.

In the present embodiment, a start end 3a and a terminal end 3b of the temperature-sensitive film pattern 3 are located at both ends of the base body 2. Stated another way, the start end 3a and the terminal end 3b are provided in directions opposite to each other. Here, for convenience, it is assumed that the start end 3a of the temperature-sensitive film pattern 3 is located on a side of a left-hand side end 2a illustrated in the drawing of the base body 2, and the terminal end 3b of the temperature-sensitive film pattern 3 is located on a side of a right-hand side end 2b illustrated in the drawing of the base body 2.

In the present embodiment, the start end 3a and the terminal end 3b of the temperature-sensitive film pattern 3 are respectively electrically connected to the first wiring portion 4 and the second wiring portion 5. The first wiring portion 4 and the second wiring portion 5 are lead wires, and a material is not limited if the material is electrically conductive. However, it is preferable that, for example, a coated copper wire obtained by plating the surface of a copper based or nickel based wire rod with tin be used.

As illustrated in FIG. 2, a connection portion of the start end 3a of the temperature-sensitive film pattern 3 and the first wiring portion 4 and a connection portion of the terminal end 3b of the temperature-sensitive film pattern 3 and the second wiring portion 5 are respectively provided with electrodes 7 and 8. The electrodes 7 and 8 are, for example, a conductive adhesive, but this is not restrictive. Therefore, the start end 3a and the terminal end 3b of the temperature-sensitive film pattern 3 can be appropriately connected and fixed to the respective wiring portions 4 and 5.

As illustrated in FIG. 2, inside the base body 2, a through-hole 9 that penetrates from the left-hand side end 2a to the right-hand side end 2b is provided. The first wiring portion 4 passes through the through-hole 9. The electrode 7 that connects and fixes the first wiring portion 4 to the start end 3a of the temperature-sensitive film pattern 3 is embedded in an opening illustrated on a left-hand side in the drawing of the through-hole 9.

Furthermore, as illustrated in FIG. 2, the first wiring portion 4 extends from an opening illustrated on a right-hand side in the drawing of the through-hole 9 in the same direction as a direction of the second wiring portion 5 (in a rightward direction in the drawing). The electrode 8 that connects and fixes the second wiring portion 5 to the terminal end 3b of the temperature-sensitive film pattern 3 is disposed in a position that does not hinder the extension of the first wiring portion 4 from the through-hole 9.

In the embodiment illustrated in FIGS. 1 and 2, the first wiring portion 4 and the second wiring portion 5 can be led out in the same direction. In this case, as illustrated in FIG. 2, the base body 2 is provided with the through-hole 9, and the first wiring portion 4 is passed into the through-hole 9. Therefore, the first wiring portion 4 and the second wiring portion 5 can be led out in the same direction.

It is preferable that a protective film 10 having electrical insulation be formed on the surface of the base body 2 to which the temperature-sensitive film pattern 3 according to the present embodiment has been applied, as illustrated in FIG. 2, but this is not restrictive. For example, the protective film 10 can be formed by performing coating, sputtering, or the like. Furthermore, a material of the protective film 10 is not particularly limited if the material has electrical insulation, but an example is epoxy resin. Note that the protective film is not illustrated in FIGS. 1 and 3.

As illustrated in FIG. 1, the first wiring portion 4 and the second wiring portion 5 that extend in the same direction (in the rightward direction in the drawing) from the right-hand side end of the base body 2 are integrally fixed by a stay 11. Note that the stay 11 is fixed by using, for example, an adhesive. As illustrated in FIG. 1, right-hand side ends of the first wiring portion 4 and the second wiring portion 5 are exposed from the stay, and are electrically connected to a not-illustrated control device. Note that the stay 11 is not illustrated in FIG. 2.

Figure 4:
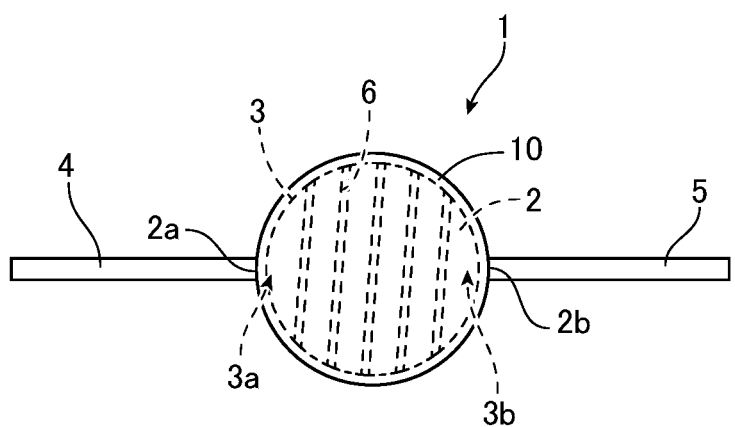
FIG. 4 is a side view illustrating a variation of the flow sensor element according to the present embodiment.

In another embodiment illustrated in FIG. 4, the start end 3a of the temperature-sensitive film pattern 3 is provided on a side of the left-hand side end 2a of the base body 2, the terminal end 3b of the temperature-sensitive film pattern 3 is provided on a side of the right-hand side end 2b of the base body 2, and the first wiring portion 4 and the second wiring portion 5 respectively extend in directions away from both ends of the base body 2 with electrodes interposed therebetween. In the embodiment illustrated in FIG. 2, in contrast to the embodiment illustrated in FIG. 1, the base body 2 does not need to be provided with a through-hole.

Figure 5:
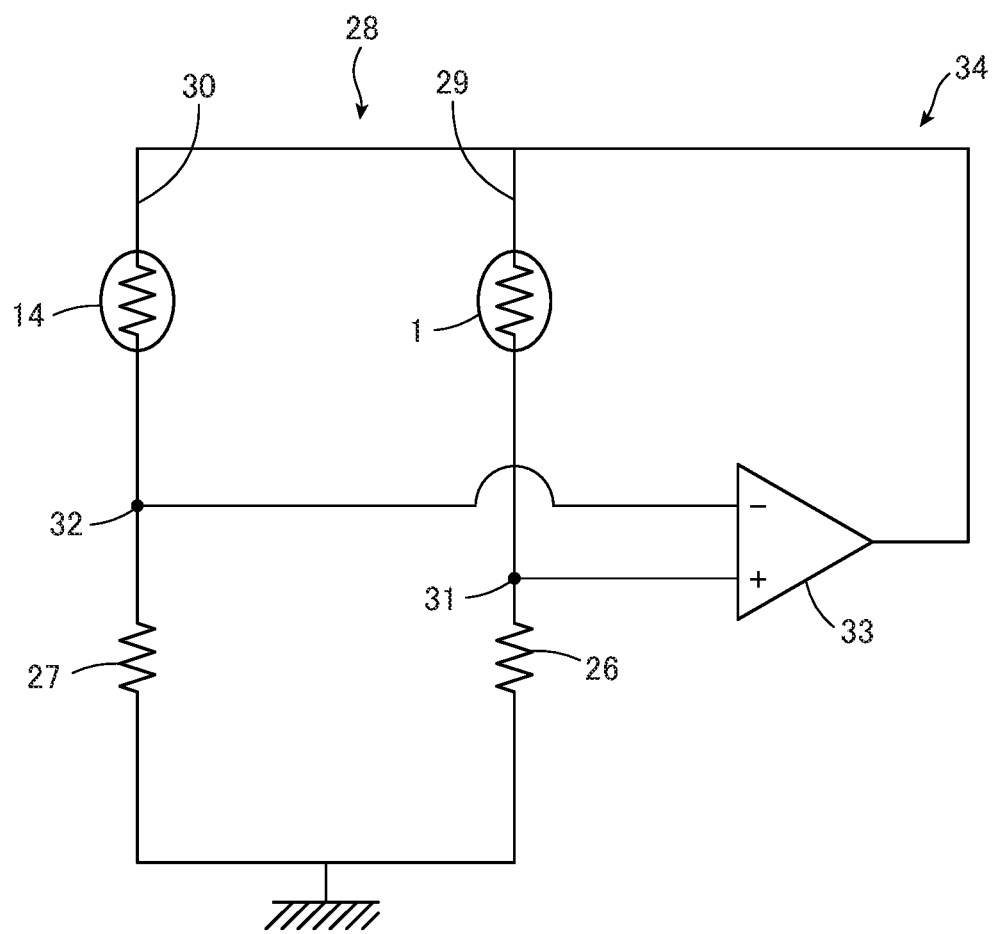
FIG. 5 is a circuit diagram (an example) of the flow sensor element according to the present embodiment.

FIG. 5 is a circuit diagram of a flow rate apparatus including the flow sensor element 1 according to the present embodiment. As illustrated in FIG. 5, the flow sensor element 1, a temperature compensation resistor element 14, and resistors 26 and 27 constitute a bridge circuit 28. As illustrated in FIG. 5, the flow sensor element 1 and the resistor 26 constitute a first series circuit 29, and the temperature compensation resistor element 14 and the resistor 27 constitute a second series circuit 30. Then, the first series circuit 29 and the second series circuit 30 are connected in parallel, and constitute the bridge circuit 28.

As illustrated in FIG. 5, an output unit 31 of the first series circuit 29 and an output unit 32 of the second series circuit 30 are each connected to a differential amplifier (an amplifier) 33. The bridge circuit 28 is connected to a feedback circuit 34 including the differential amplifier 33. The feedback circuit 34 includes a transistor (not illustrated) or the like.

The resistors 26 and 27 have a temperature coefficient of resistance (TCR) that is smaller than TCRs of the flow sensor element 1 and the temperature compensation resistor element 14. The flow sensor element 1 is controlled to have a predetermined resistance value Rs1, for example, in a heated state where temperature has been controlled to be higher by a predetermined value than a predetermined ambient temperature. Furthermore, the temperature compensation resistor element 14 is controlled to have a predetermined resistance value Rs2, for example, at the ambient temperature described above. Note that the resistance value Rs1 is smaller than the resistance value Rs2. For example, the resistance value Rs2 is about several times to more than ten times as large as the resistance value Rs1, but this is not restrictive. The resistor 26 that constitutes the first series circuit 29, together with the flow sensor element 1 is, for example, a fixed resistor having a resistance value R1 that is similar to the resistance value Rs1 of the flow sensor element 1. Furthermore, the resistor 27 that constitutes the second series circuit 30, together with the temperature compensation resistor element 14 is, for example, a fixed resistor having a resistance value R2 that is similar to the resistance value Rs2 of the temperature compensation resistor element 14.

If wind hits the flow sensor element 1, the temperature of the flow sensor element 1 serving as a heat generation resistor decreases, and a potential of the output unit 31 of the first series circuit 29 that is connected to the flow sensor element 1 varies. Therefore, a differential output is obtained by the differential amplifier 33. Then, in the feedback circuit 34, a driving voltage is applied to the flow sensor element 1 on the basis of the differential output. The flow sensor element 1 can calculate and output wind speed on the basis of a change in a voltage required to heat the flow sensor element 1. If wind speed changes, the temperature of the flow sensor element 1 also changes, and therefore wind speed can be sensed.

According to the present embodiment, the temperature-sensitive film pattern 3 is formed over the entirety of the surface of the base body 2 having a spherical shape. Therefore, whichever direction wind hits the base body 2 from, wind can be sensed, and a non-directional and uniform sensor sensitivity can be obtained. Furthermore, in the present embodiment, the base body 2 has a spherical shape. Therefore, size can be reduced, excellent responsiveness can be achieved, and an effect in which an air flow is not likely to be disturbed can also be exhibited.

A pattern shape of the temperature-sensitive film pattern 3 is not limited. However, a spiral pattern is employed. Therefore, whichever direction wind hits the entirety of the surface of the base body 2 having a spherical shape from, wind comes into contact with the temperature-sensitive film pattern 3 by a roughly equal area, and a uniform sensor sensitivity can be achieved more effectively.

In the present embodiment, as the flow sensor element 1, a wind sensor element has been described as an example. However, a flow sensor element that can sense the flow speed of liquid may be used.

INDUSTRIAL APPLICABILITY

According to the present invention, a flow sensor element that is non-directional and has an excellent sensor sensitivity can be manufactured. Therefore, the flow sensor element can be suitably applied to the purposes of a fluid having an unfixed direction. In the present invention, a flow sensor element can be used regardless of the outdoors or the indoors. A light-emitting element such as an LED is disposed in the flow sensor element according to the present invention, and light is emitted in a case where wind has been sensed. By employing this configuration, the flow sensor element according to the present invention can be applied to the purpose of illumination or the like. Furthermore, the flow sensor element according to the present invention can also be applied to the purpose of experiments, the purpose of analysis, or the like.

The present application is based on Japanese Patent Application No. 2020-113910, filed on Jul. 1, 2020. The entire contents thereof are incorporated herein by reference.

The invention claimed is:

1. A flow sensor element comprising:
a base body having a spherical shape; and
a temperature-sensitive film pattern that is disposed over an entirety of a surface of the base body, and changes in an electrical resistance value due to a change in temperature,
wherein first and second ends of the temperature-sensitive film pattern are respectively connected to a first wiring portion and a second wiring portion,
the first wiring portion passes through a through-hole that is formed in the base body, and is led out in a same direction as a direction of the second wiring portion, and
the first wiring portion is connected and fixed to the first end of the temperature-sensitive film pattern via an electrode that is embedded in an opening of the through-hole.

2. The flow sensor element according to claim 1, wherein the temperature-sensitive film pattern is formed by trimming a temperature-sensitive film that has been formed on the surface of the base body.

3. The flow sensor element according to claim 1, wherein the temperature-sensitive film pattern is formed to have a spiral pattern.

* * * * *